(12) United States Patent
Yan et al.

(10) Patent No.: US 10,960,353 B2
(45) Date of Patent: Mar. 30, 2021

(54) ALL-CONDITION AUXILIARY DENITRATION SYSTEM AND OPERATION METHOD THEREOF

(71) Applicant: XI'AN JIAOTONG UNIVERSITY, Shaanxi (CN)

(72) Inventors: Hui Yan, Shaanxi (CN); Daotong Chong, Shaanxi (CN); Ming Liu, Shaanxi (CN); Jinshi Wang, Shaanxi (CN); Weixiong Chen, Shaanxi (CN); Junjie Yan, Shaanxi (CN)

(73) Assignee: XI'AN JIATONG UNIVERSITY, Shaanxi (CN)

( * ) Notice: Subject to any disclaimer, the term of this patent is extended or adjusted under 35 U.S.C. 154(b) by 0 days.

(21) Appl. No.: 17/042,933

(22) PCT Filed: Jun. 22, 2019

(86) PCT No.: PCT/CN2019/092428
§ 371 (c)(1),
(2) Date: Sep. 29, 2020

(87) PCT Pub. No.: WO2020/181676
PCT Pub. Date: Sep. 17, 2020

(65) Prior Publication Data
US 2021/0016224 A1 Jan. 21, 2021

(30) Foreign Application Priority Data
Mar. 11, 2019 (CN) .......................... 201910181981.7

(51) Int. Cl.
*B01D 53/86* (2006.01)
*B01D 53/34* (2006.01)

(52) U.S. Cl.
CPC ....... *B01D 53/8631* (2013.01); *B01D 53/343* (2013.01); *B01D 53/8696* (2013.01)

(58) Field of Classification Search
CPC .............. B01D 53/8631; B01D 53/343; B01D 53/8696
See application file for complete search history.

(56) References Cited

U.S. PATENT DOCUMENTS

2007/0231232 A1  10/2007  Lin et al.

FOREIGN PATENT DOCUMENTS

| CN | 103673650 A | 3/2014 |
| CN | 104295364 A | 1/2015 |

(Continued)

*Primary Examiner* — Anita Nassiri-Motlagh

(57) ABSTRACT

An all-condition auxiliary denitration system and an operation method thereof are provided. The system includes a heat-storage medium heater, a low-temperature reheater, an economizer, and an SCR denitration device which are successively interconnected, and further including a heat-storage medium tank and a heat-storage medium and feedwater heat exchanger. A flow of a cold heat-storage medium entering the heat-storage medium heater is regulated, so that heat absorption of the heat-storage medium is matched with a boiler load. Flows of hot heat-storage medium and feedwater, which enter the heat-storage medium and feedwater heat exchanger, are regulated through a feedwater regulating valve and a hot heat-storage medium outlet regulating valve. A total feedwater flow is regulated with assistance of a bypass feedwater regulating valve, so that a temperature of flue gas entering the SCR denitration device is kept in an optimal operation range under different boiler loads, and denitration efficiency is ensured.

5 Claims, 1 Drawing Sheet

(56) References Cited

FOREIGN PATENT DOCUMENTS

| CN | 205447779 U | 8/2016 |
|---|---|---|
| CN | 107478067 A | 12/2017 |
| CN | 206973508 U | 2/2018 |

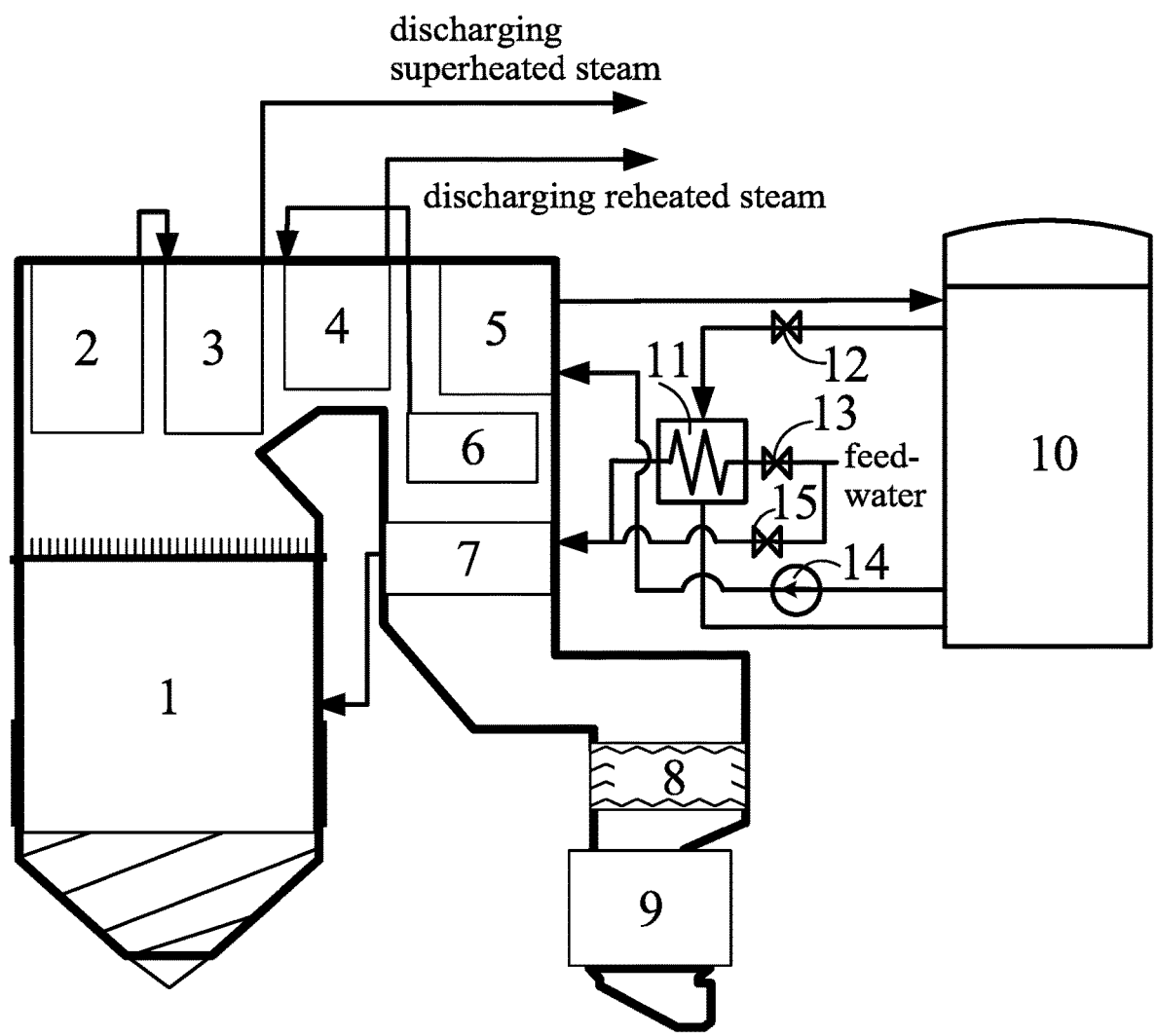

ALL-CONDITION AUXILIARY DENITRATION SYSTEM AND OPERATION METHOD THEREOF

BACKGROUND OF THE PRESENT INVENTION

Field of Invention

The present invention relates to a technical field of denitration of coal-fired power generation, and more particularly to an all-condition auxiliary denitration system and an operation method thereof.

Description of Related Arts

One of the major atmospheric pollutants generated by the coal-fired power plant is $NO_x$ (oxynitrides), mainly comprising NO (nitric oxide) and $NO_2$ (nitrogen dioxide), wherein: NO accounts for about 95% of $NO_x$ generated by coal burning. All of $NO_x$ have different degrees of toxicity, which greatly damage the environment. Moreover, in the power system of China, the coal-fired power generating unit occupies a large proportion of the installed capacity. Denitration, as an obligatory target, is added for the energy conservation and emission reduction target in China. In order to avoid that coal burning in the boiler generates too much $NO_x$ to pollute the environment, the coal should be denitrified. The SCR (Selective Catalytic Reduction) denitration technology is the maturest flue gas denitration technology at present, where $NO_x$ is selectively reacted with to generate $N_2$ and $H_2O$ under the effect of the catalyst. However, the catalyst reaction temperature of the SCR denitration technology is required to be in a working temperature range (280-420° C.). Excessive-low temperature will reduce the catalyst activity and cause the decreased denitration efficiency, while excessive-high temperature easily causes the increased $NO_x$ production; in addition, the catalyst activity will be degenerated due to the phase change. No reasonable solution has been able to satisfy the high load and low load operation of the coal-fired power plant while guaranteeing that the temperature of the flue gas entering the SCR denitration device is in the optimal operation temperature range of the denitration system. The problems need to be solved are described as follows:

(1) when the boiler operates with the high load; the temperature of the flue gas entering the SCR denitration device needs to be appropriately decreased, so that the temperature is kept in the optimal operation temperature range of the denitration device and does not have a large change; and (2) when the boiler operates with the low load, the temperature of the flue gas entering the SCR denitration device needs to be appropriately increased, so that the temperature is kept in the optimal operation temperature range of the denitration device and does not have a large change.

SUMMARY OF THE PRESENT INVENTION

In order to solve above problems existing in prior art, an object of the present invention is to provide an all-condition auxiliary denitration system and an operation method thereof. Through adding a heat-storage device, the present invention stores heat with a heat-storage medium at a high temperature under a high load and reheats flue gas with the heat-storage medium under a low load, so that a temperature of the flue gas entering an SCR (Selective Catalytic Reduction) denitration device does not have a large change and is always kept in a working range.

In order to accomplish the above object, the present invention adopts technical solutions as follows.

An all-condition auxiliary denitration system is provided, comprising a water-cooled wall, a platen superheater, a final superheater, a final reheater, a heat-storage medium heater, a low-temperature reheater, an economizer, an SCR denitration device, and an air preheater which are successively interconnected, and further comprising a heat-storage medium tank, a heat-storage medium and feedwater heat exchanger, a hot heat-storage medium outlet regulating valve, a feedwater regulating valve, a heat-storage medium pump, and a bypass feedwater regulating valve, wherein: an inlet of the heat-storage medium heater is interconnected to a cold heat-storage medium outlet of the heat-storage medium tank through the heat-storage medium pump; an outlet of the heat-storage medium heater is interconnected to a hot heat-storage medium inlet of the heat-storage medium tank through a pipeline; a heat-storage medium inlet of the heat-storage medium and feedwater heat exchanger is interconnected to a hot heat-storage medium outlet of the heat-storage medium tank through the hot heat-storage medium outlet regulating valve; a heat-storage medium outlet of the heat-storage medium and feedwater heat exchanger is interconnected to a cold heat-storage medium inlet of the heat-storage medium tank through a pipeline; a feedwater inlet of the heat-storage medium and feedwater heat exchanger is interconnected to the feedwater regulating valve; a feedwater outlet of the heat-storage medium and feedwater heat exchanger is interconnected to a feedwater inlet of the economizer through a pipeline; a feedwater inlet of the bypass feedwater regulating valve is interconnected to a feedwater inlet of the feedwater regulating valve; a feedwater outlet of the bypass feedwater regulating valve is interconnected to the feedwater inlet of the economizer; a superheated-steam outlet of the platen superheater is interconnected to a superheated-steam inlet of the final superheater; a reheated-steam outlet of the low-temperature reheater is interconnected to a reheated-steam inlet of the final reheater; and a feedwater outlet of the economizer is interconnected to the water-cooled wall through a pipeline.

Preferably, the heat-storage medium heater is arranged at a flue corner between the final reheater and the low-temperature reheater.

Preferably, a flue gas temperature at a position of a flue, where the heat-storage medium heater is located, is higher than 550° C.

Preferably, a heat-storage medium in the heat-storage medium tank is fused or heat transfer oil, which is a single-phase flowing medium.

An operation method of the all-condition auxiliary denitration system comprises steps of:

if a boiler operates under a high load, starting the heat-storage medium pump; through the heat-storage medium pump, regulating a flow of a cold heat-storage medium which enters the heat-storage medium heater and exchanges heat with high-temperature flue gas; through the hot heat-storage medium inlet of the heat-storage medium tank, restoring a heated heat-storage medium into the heat-storage medium tank; through closing or turning down the hot heat-storage medium outlet regulating valve, regulating a flow of a hot heat-storage medium which enters the heat-storage medium and feedwater to heat exchanger; through the feedwater regulating valve, regulating a flow of feedwater which enters the heat-storage medium and feedwater heat exchanger; through the feedwater regulating valve assisted with the bypass feedwater regulating valve, regulating a total flow of feedwater which enters the economizer; wherein: a regulation target is storing redundant heat of the high-temperature flue gas into the heat-storage medium when the boiler operates under the high load, so as to guarantee that a temperature of flue gas entering the SCR denitration device is in an optimal operation temperature range of the denitration system, ensure a denitration efficiency, and match a total feedwater quantity with the boiler load; and if the boiler operates under a low load and the temperature of the flue gas entering the SCR denitration device is unable to reach a catalyst active temperature range, through the heat-storage medium pump, regulating the flow of the cold heat-storage medium which enters the heat-storage medium heater and exchanges heat with the flue gas; through opening or turning up the hot heat-storage medium outlet regulating valve, regulating the flow of the hot heat-storage medium which enters the heat-storage medium and feedwater heat exchanger; through the feedwater regulating valve, regulating the flow of feedwater which enters the heat-storage medium and feedwater heat exchanger; through the feedwater regulating valve assisted with the bypass feedwater regulating valve, regulating the total flow of feedwater which enters the economizer; wherein: regulation targets are to match the total feedwater quantity with the boiler load, increase the flue gas temperature and a feedwater temperature, and decrease an amount of feedwater heat absorption in the economizer, so that the temperature of the flue gas entering the SCR denitration device is in the optimal operation temperature range of the denitration system, and the denitration efficiency is ensured.

Compared with the prior present invention has advantages as follows.

(1) Through adding the heat-storage medium heater and the heat-storage medium tank, the present invention is able to regulate the temperature of the flue gas entering the denitration device, so that the temperature of the flue gas entering the denitration device is always kept in the optimal operation temperature range of the to denitration system, and the denitration efficiency is ensured. The present invention has the advantages of simple structure, small investment, low pollutant emission and good environmental protection effect.

(2) According to the present invention, through adding the heat storage, the redundant heat in the high-temperature flue gas is stored under the high load, and compensates the heat insufficiency under the low load, which improves the energy utilization rate.

(3) According to the present invention, through regulating the hot heat-storage medium outlet regulating valve, the temperature and the flow of the heat-storage medium entering the heat-storage medium and feedwater heat exchanger are controlled; through regulating the feedwater regulating valve and the bypass feedwater regulating valve, the overall temperature and the total flow of feedwater entering the economizer are controlled; through exchanging heat with the heat-storage medium outside the coal-fired power generating unit, the feedwater temperature is increased, which is beneficial to improving the flexibility of the coal-fired power plant.

BRIEF DESCRIPTION OF THE DRAWINGS

The FIGURE is a sketch view of an all-condition auxiliary denitration system according to a preferred embodiment of the present invention.

DETAILED DESCRIPTION OF THE PREFERRED EMBODIMENT

The present invention is further described in detail with the accompanying drawing and the preferred embodiment.

As shown in the FIGURE, according to the preferred embodiment of the present invention, an all-condition auxiliary denitration system is provided, comprising a water-cooled wall 1, a platen superheater 2, a final superheater 3, a final reheater 4, a heat-storage medium heater 5, a low-temperature reheater 6, an economizer 7, an SCR (Selective Catalytic Reduction) denitration device 8, and an air pre-heater 9 which are successively interconnected, and further comprising a heat-storage medium tank 10, a heat-storage medium and feedwater heat exchanger 11, a hot heat-storage medium outlet regulating valve 12, a feedwater regulating valve 13, a heat-storage medium pump 14, and a bypass feedwater regulating valve 15, wherein: an inlet of the heat-storage medium heater 5 is interconnected to a cold heat-storage medium outlet of the heat-storage medium tank 10 through the heat-storage medium pump 14; an outlet of the heat-storage medium heater 5 is interconnected to a hot heat-storage medium inlet of the heat-storage medium tank 10 through a pipeline; a heat-storage medium inlet of the heat-storage medium and feedwater heat exchanger 11 is interconnected to a hot heat-storage medium outlet of the heat-storage medium tank 10 through the hot heat-storage medium outlet regulating valve 12; a heat-storage medium outlet of the heat-storage medium and feedwater heat exchanger 11 is interconnected to a cold heat-storage medium inlet of the heat-storage medium tank 10 through a pipeline; a feedwater inlet of the heat-storage medium and feedwater heat exchanger 11 is interconnected to the feedwater regulating valve 13; a feedwater outlet of the heat-storage medium and feedwater heat exchanger 11 is interconnected to a feedwater inlet of the economizer 7 through a pipeline; a feedwater inlet of the bypass feedwater regulating valve 15 is interconnected to a feedwater inlet of the feedwater regulating valve 13; a feedwater outlet of the bypass feedwater regulating valve 15 is interconnected to the feedwater inlet of the economizer 7; a superheated-steam outlet of the platen superheater 2 is interconnected to a superheated-steam inlet of the final superheater 3; a reheated-steam outlet of the low-temperature reheater 6 is interconnected to a reheated-steam inlet of the final reheater 4; and a feedwater outlet of the economizer 7 is interconnected to the water-cooled wall 1 through a pipeline.

In the preferred embodiment, the heat-storage medium heater 5 is arranged at a flue corner between the final reheater 4 and the low-temperature reheater 6, where a flue to gas temperature is high; so as to guarantee an optimal operation temperature required by the denitration system under all conditions.

In the preferred embodiment, a flue gas temperature at a position of a flue, where the heat-storage medium heater 5 is located, is higher than 550° C., so as to guarantee that stored energy of a heat-storage medium is high-grade energy.

In the preferred embodiment, a heat-storage medium in the heat-storage medium tank 10 is fused salt or heat transfer oil, which is a single-phase flowing medium, so as to ensure single-phase flowing in the heat exchanger and improve system safety and stability.

As shown in the FIGURE, an operation method of the all-condition auxiliary denitration system comprises steps of:

if a boiler operates under a high load, starting the heat-storage medium pump 14; through the heat-storage medium pump 14, regulating a flow of a cold heat-storage medium which enters the heat-storage medium heater 5 and exchanges heat with high-temperature flue gas; through the hot heat-storage medium inlet of the heat-storage medium tank 10, restoring a heated heat-storage medium into the heat-storage medium tank 10; through closing or turning down the hot heat-storage medium outlet regulating valve 12, regulating a flow of a hot heat-storage medium which enters the heat-storage medium and feedwater heat exchanger 11; through the feedwater regulating valve 13; regulating a flow of feedwater which enters the heat-storage medium and feedwater heat exchanger 11; through the feedwater regulating valve 13 assisted with the bypass feedwater regulating valve 15, regulating a total flow of feedwater which enters the economizer 7; wherein: a regulation target is storing redundant heat of the high-temperature flue gas into the heat-storage medium when the boiler operates under the high load, so as to guarantee that a temperature of flue gas entering the SCR denitration device 8 is in an optimal operation temperature range of the denitration system, ensure a denitration efficiency, and match a total feedwater quantity with the boiler load; and to if the boiler operates under a low load and the temperature of the flue gas entering the SCR denitration device 8 is unable to reach a catalyst active temperature range, through the heat-storage medium pump 14, regulating the flow of the cold heat-storage medium which enters the heat-storage medium heater 5 and exchanges heat with the flue gas; through opening or turning up the hot heat-storage medium outlet regulating valve 12, regulating the flow of the hot heat-storage medium which enters the heat-storage medium and feedwater heat exchanger 11; through the feedwater regulating valve 13, regulating the flow of feedwater which enters the heat-storage medium and feedwater heat exchanger 11; through the feedwater regulating valve 13 assisted with the bypass feedwater regulating valve 15, regulating the total flow of feedwater which enters the economizer 7; wherein: regulation targets are to match the total feedwater quantity with the boiler load, increase the flue gas temperature and a feedwater temperature, and decrease an amount of feedwater heat absorption in the economizer 7, so that the temperature of the flue gas entering the SCR denitration device is in the optimal operation temperature range of the denitration system, and the denitration efficiency is ensured.

With adopting the heat-storage medium for storing heat at a high temperature, the present invention breaks coupling between the load of the boiler of the coal-fired power generating unit and the temperature of the flue gas entering the SCR denitration device, and regulates the flow of the heat-storage medium entering the heat-storage medium heater 5; when the boiler operates under the high load, the heat-storage medium absorbs the redundant energy in the flue gas and then is stored in the heat-storage medium tank 10, so as to appropriately decrease the flue gas temperature; when the boiler operates under the low load, the flue gas is heated, so as to guarantee that the temperature of the flue gas entering the SCR denitration device 8 does not have a large change with the boiler load and is always kept in the optimal operation temperature range of the denitration system, to ensure the denitration efficiency, and to improve the energy utilization rate. Moreover, through the hot heat-storage medium outlet regulating valve 12 and the feedwater regulating valve 13, the temperature and the flow of feedwater entering the heat-storage medium and feedwater heat exchanger 11 are controlled; through exchanging heat with the heat-storage medium outside the coal-fired power generating unit, the feedwater temperature is increased, which is beneficial to improving the flexibility of the coal-fired power plant; through the feedwater regulating valve 13 assisted with the bypass feedwater regulating valve 15, the total flow of feedwater entering the economizer 7 is regulated, so that the total feedwater quantity is matched with the boiler load.

What is claimed is:

1. An all-condition auxiliary denitration system, comprising a water-cooled wall (1), a platen superheater (2), a final superheater (3), a final reheater (4), a heat-storage medium heater (5), a low-temperature reheater (6), an economizer (7), an SCR (Selective Catalytic Reduction) denitration device (8), and an air preheater (9) which are successively interconnected, and further comprising a heat-storage medium tank (10), a heat-storage medium and feedwater heat exchanger (11), a hot heat-storage medium outlet regulating valve (12), a feedwater regulating valve (13), a heat-storage medium pump (14), and a bypass feedwater regulating valve (15), wherein: an inlet of the heat-storage medium heater (5) is interconnected to a cold heat-storage medium outlet of the heat-storage medium tank (10) through the heat-storage medium pump (14); an outlet of the heat-storage medium heater (5) is interconnected to a hot heat-storage medium inlet of the heat-storage medium tank (10) through a pipeline; a heat-storage medium inlet of the heat-storage medium and feedwater heat exchanger (11) is interconnected to a hot heat-storage medium outlet of the heat-storage medium tank (10) through the hot heat-storage medium outlet regulating valve (12); a heat-storage medium outlet of the heat-storage medium and feedwater heat exchanger (11) is interconnected to a cold heat-storage medium inlet of the heat-storage medium tank (10) through a pipeline; a feedwater inlet of the heat-storage medium and feedwater heat exchanger (11) is interconnected to the feedwater regulating valve (13); a feedwater outlet of the heat-storage medium and feedwater heat exchanger (11) is interconnected to a feedwater inlet of the economizer (7) through a pipeline; a feedwater inlet of the bypass feedwater regulating valve (15) is interconnected to a feedwater inlet of the feedwater regulating valve (13); a feedwater outlet of the bypass feedwater regulating valve (15) is interconnected to the feedwater inlet of the economizer (7); a superheated-steam outlet of the platen superheater (2) is interconnected to a superheated-steam inlet of the final superheater (3); a reheated-steam outlet of the low-temperature reheater (6) is interconnected to a reheated-steam inlet of the final reheater (4); and a feedwater outlet of the economizer (7) is interconnected to the water-cooled wall through a pipeline.

2. The all-condition auxiliary denitration system, as recited in claim 1, wherein: the heat-storage medium heater (5) is arranged at a flue corner between the final reheater (4) and the low-temperature reheater (6).

3. The all-condition auxiliary denitration system, as recited in claim 1, wherein: a flue gas temperature at a position of a flue, where the heat-storage medium heater (5) is located, is higher than 550° C.

4. The all-condition auxiliary denitration system, as recited in claim 1, wherein: a heat-storage medium in the heat-storage medium tank (10) is fused salt or heat transfer oil, which is a single-phase flowing medium.

5. An operation method of the all-condition auxiliary denitration system as recited in claim 1, comprising steps of:

if a boiler works under a high load, starting the heat-storage medium pump (14); through the heat-storage medium pump (14), regulating a flow of a cold heat-storage medium which enters the heat-storage medium heater (5) and exchanges heat with high-temperature flue gas; through the hot heat-storage medium inlet of the heat-storage medium tank (10), restoring a heated heat-storage medium into the heat-storage medium tank (10); through closing or turning down the hot heat-storage medium outlet regulating valve (12), regulating a flow of a hot heat-storage medium which enters the heat-storage medium and feedwater heat exchanger (11); through the feedwater regulating valve (13), regulating a flow of feedwater which enters the heat-storage medium and feedwater heat exchanger (11); through the feedwater regulating valve (13) assisted with the bypass feedwater regulating valve (15), regulating a total flow of feedwater which enters the economizer (7); wherein: a regulation target is storing redundant heat of the high-temperature flue gas into the heat-storage medium when the boiler works under the high load, so as to guarantee that a temperature of flue gas entering the SCR denitration device (8) is in an operation temperature range of the denitration system, ensure a denitration efficiency, and match a total feedwater quantity with a boiler load; and if the boiler works under a low load and the temperature of the flue gas entering the SCR denitration device (8) is unable to reach a catalyst activity range, through the heat-storage medium pump (14), regulating the flow of the cold heat-storage medium which enters the heat-storage medium heater (5) and exchanges heat with the flue gas; through opening or turning up the hot heat-storage medium outlet regulating valve (12), regulating the flow of the hot heat-storage medium which enters the heat-storage medium and feedwater heat exchanger (11); through the feedwater regulating valve (13), regulating the flow of feedwater which enters the heat-storage medium and feedwater heat exchanger (11); through the feedwater regulating valve (13) assisted with the bypass feedwater regulating valve (15), regulating the total flow of feedwater which enters the economizer (7); wherein: regulation targets are to match the total feedwater quantity with the boiler load, increase the flue gas temperature and a feedwater temperature, and decrease a heat absorption amount of feedwater in the economizer (7), so that the temperature of the flue gas entering the SCR denitration device is in the operation temperature range of the denitration system, and the denitration efficiency is ensured.

* * * * *